(12) United States Patent
Qian et al.

(10) Patent No.: US 11,186,208 B2
(45) Date of Patent: Nov. 30, 2021

(54) CHILD SAFETY SEAT AND ITS MANUFACTURING PROCESS

(71) Applicant: HANGZHOU YUEMENG INDUSTRY CO., LTD., Hangzhou (CN)

(72) Inventors: Jianhong Qian, Hangzhou (CN); Jianhong Yuan, Hangzhou (CN); Hangjian Qiu, Hangzhou (CN); Qianglong Fan, Hangzhou (CN); Mingjun Liu, Hangzhou (CN); Chaoyang Shen, Hangzhou (CN)

(73) Assignee: BUTONG SAFETY TECHNOLOGY (NINGBO) CO., LTD., Ningbo (CN)

( * ) Notice: Subject to any disclaimer, the term of this patent is extended or adjusted under 35 U.S.C. 154(b) by 182 days.

(21) Appl. No.: 16/498,754

(22) PCT Filed: Sep. 25, 2018

(86) PCT No.: PCT/CN2018/107231
§ 371 (c)(1),
(2) Date: Sep. 27, 2019

(87) PCT Pub. No.: WO2019/062688
PCT Pub. Date: Apr. 4, 2019

(65) Prior Publication Data
US 2021/0107383 A1 Apr. 15, 2021

(30) Foreign Application Priority Data
Sep. 27, 2017 (CN) .......................... 201710889436.4

(51) Int. Cl.
*B60N 2/28* (2006.01)
*B60N 2/70* (2006.01)
*B60N 2/68* (2006.01)

(52) U.S. Cl.
CPC ......... *B60N 2/2851* (2013.01); *B60N 2/2881* (2013.01); *B60N 2/682* (2013.01); *B60N 2/7017* (2013.01)

(58) Field of Classification Search
CPC ... B60N 2/7017; B60N 2/2881; B60N 2/2851
See application file for complete search history.

(56) References Cited

U.S. PATENT DOCUMENTS 6,464,294 B1 * 10/2002 Kain .................... B60N 2/2812
297/250.1
2001/0054837 A1 * 12/2001 O'Connor .............. B60N 2/868
297/397

(Continued)

FOREIGN PATENT DOCUMENTS

CN 201863737 U 6/2011
CN 202463624 U 10/2012

(Continued)

*Primary Examiner* — Timothy J Brindley
(74) *Attorney, Agent, or Firm* — Bayramoglu Law Offices LLC

(57) ABSTRACT

A child safety seat, including a headrest frame assembly and a seat frame assembly The seat frame assembly is matedly connected with the headrest frame assembly. The headrest frame assembly includes a headrest frame, an inner wall of the headrest frame is provided with a headrest polyurethane soft foam, the headrest polyurethane soft foam extends toward an outer wall of both sides of the headrest frame to form an everted rim, and the outer wall of the said headrest frame is provided with a headrest shell. The seat frame assembly includes a seat frame, an inner wall of the seat frame is provided with a seat polyurethane soft foam, the seat polyurethane soft foam extends toward an outer wall of both sides of the seat frame to form an everted rim, and the outer wall of the seat frame is provided with a seat shell.

5 Claims, 10 Drawing Sheets

(56) References Cited

U.S. PATENT DOCUMENTS

| | | | | |
|---|---|---|---|---|
| 2006/0267386 A1* | 11/2006 | Nakhla | ............... | B29C 44/1271 |
| | | | | 297/250.1 |
| 2008/0111412 A1* | 5/2008 | Woellert | ............... | B60N 2/2851 |
| | | | | 297/256.1 |
| 2010/0295347 A1* | 11/2010 | Marsden | ............... | B60N 2/2872 |
| | | | | 297/216.11 |
| 2011/0012406 A1* | 1/2011 | Gibson | ................ | B60N 2/2872 |
| | | | | 297/250.1 |
| 2013/0320725 A1* | 12/2013 | Conway | ............... | B60N 2/2863 |
| | | | | 297/256.11 |
| 2014/0049081 A1* | 2/2014 | Davis | ........................ | B60N 2/26 |
| | | | | 297/256.11 |
| 2015/0175036 A1* | 6/2015 | Gaudreau, Jr. | ...... | B60N 2/2845 |
| | | | | 297/256.12 |
| 2016/0362025 A1* | 12/2016 | Heisey | ................. | B60N 2/2851 |
| 2017/0106772 A1* | 4/2017 | Williams | ............. | B60N 2/2872 |
| 2019/0084450 A1* | 3/2019 | Kaiser | .................. | B60N 2/2851 |
| 2019/0092194 A1* | 3/2019 | Johnson | ................. | B60N 2/829 |

FOREIGN PATENT DOCUMENTS

| | | | | |
|---|---|---|---|---|
| CN | 104742765 A | 7/2015 | | |
| CN | 204547857 U | 8/2015 | | |
| CN | 105015377 A | 11/2015 | | |
| CN | 107813742 A | 3/2018 | | |
| CN | 207403611 U | 5/2018 | | |
| EP | 3078541 A1 | 10/2016 | | |
| EP | 3680128 A1 * | 7/2020 | ........... | B60N 2/2863 |
| WO | WO-2014053009 A1 * | 4/2014 | ........... | B60N 2/2884 |

* cited by examiner

CHILD SAFETY SEAT AND ITS MANUFACTURING PROCESS

CROSS REFERENCE TO RELATED APPLICATIONS

This application is the national phase of International Application No. PCT/CN2018/107231, filed on Sep. 25, 2018, which is based upon and claims priority to Chinese Patent Application No. CN201710889436.4, filed on Sep. 27, 2017, the entire contents of which are incorporated herein by reference.

TECHNICAL FIELD

This invention relates to a safety seat, in particularly to a child safety seat and its manufacturing process.

BACKGROUND

The existing child safety seats are usually assembled with shock-absorbing material such as EPS (expandable polystyrene) wrapped with cloth cover and plastic parts. As shock-absorbing materials such as EPS are hard, and the cloth cover for wrapping is thin, the children still under physical development will be annoyed and crying because of uncomfortable sitting, and they will not sit securely on the seat; in this case, it is very dangerous when the car is moving, and the consequence is even worse than that resulting from sitting without wearing a seat belt. With the improvement of people's living standards and the development of the transportation system, self-driving travel is more and more common. There are great market prospects and an important application value for the research and development of child safety seats, which are safe and comfortable for children and will not make children fatigue easily after long-time sitting.

The Chinese patent (Patent No. 201510083301.X) discloses an adjustment mechanism for adjusting the headrest height of child safety seats, and the child safety seat includes a seat body and a headrest. The headrest is slidably mounted on the seat body to slide up and down. The adjustment mechanism includes an actuator and a locking device, wherein the locking device is releasably locking the headrest at a preselected height, and the actuator is used to release the locking device through its own action, so that the height of the headrest can be adjusted. The actuator is located between the headrest and the seat body, and extends out to the headrest. Preferably, the locking device includes the first component mounted on the seat body and the second component mounted on the headrest, wherein the second component releasably engages with the first component

SUMMARY

This invention mainly solves the deficiencies in the prior art, and provides a child safety seat and its manufacturing process with high compactness, excellent comfort, convenient assembly and high firmness.

This invention solves the above technical problems mainly through the following technical solution:

A child safety seat comprising a headrest frame assembly and a seat frame assembly, and the seat frame assembly is matedly connected with the headrest frame assembly;

The headrest frame assembly includes a headrest frame, the inner wall of the headrest frame is provided with headrest polyurethane soft foam, the headrest polyurethane soft foam extends toward the outer wall of both sides of the headrest frame to form an everted rim, and the outer wall of the headrest frame is provided with a headrest shell;

The seat frame assembly includes a seat frame, the inner wall of the seat frame is provided with seat polyurethane soft foam, the seat polyurethane soft foam extends toward the outer wall of both sides of the seat frame to form an everted rim, and the outer wall of the seat frame is provided with a seat shell;

Both the headrest polyurethane soft foam and the seat polyurethane soft foam are covered with a surface layer.

Preferably, the headrest frame comprises a headrest frame body distributed in a "U" shape, the headrest frame body is divided into an integrated headrest frame body or a split headrest frame body, the left side, the middle and the right side of the outer wall of the headrest frame body are respectively provided with a plurality of headrest frame embedded studs and self-tapping threaded columns, the left and right sides of the outer wall of the headrest frame body are respectively provided with a plurality of headrest curved positioning ribs, the outer side of the headrest curved positioning ribs is provided with a headrest positioning slot, the upper side of the middle part of the outer wall of the headrest frame body is provided with a mold positioning rod protruding outwardly and obliquely, and the left and right sides of the headrest frame body are respectively provided with snap-in positioning pieces;

The headrest shell includes a headrest shell body distributed in a "U" shape, the inner wall of the headrest shell body is provided with shell embedded nut mounting holes that match the embedded studs of the headrest frame, and the left and right sides of the inner wall of the headrest shell body are respectively provided with shell positioning ribs that match the headrest positioning slot.

Preferably, the split type headrest frame body comprises an upper headrest frame body and a lower headrest frame body, the upper headrest frame body is provided with an insertion rod, the lower headrest frame body is provided with a slot, the insertion rod is inserted downward into the slot, and the contact surface of the bottom of the upper headrest frame body is in movable contact with the contact surface of the bottom of the lower headrest frame body.

Preferably, the shell positioning ribs comprise curved shell positioning ribs, the outer side of the curved shell positioning ribs is provided with an outwardly protruding curved shell positioning head, and the curved shell positioning head mates with the headrest positioning slot in a snap-fit manner.

Preferably, the seat frame comprises a seat frame body distributed in a "~" shape, the middle of the back side of the seat frame body is provided with a plurality of continuously distributed seat frame studs, the edge of the seat frame studs is provided with a plurality of seat frame positioning ribs fixed to the seat frame body, and the upper and lower parts of the middle of the back side of the seat frame body are respectively provided with seat frame embedded nuts; the side walls of the back side of the seat frame body are respectively provided with a plurality of curved seat frame positioning ribs, and the outer side of the curved seat frame positioning ribs is provided with a seat frame positioning slot;

The seat shell includes a seat shell body in a "~" shape, the inner wall of the seat shell body is provided with seat shell embedded nut mounting holes that match the seat frame embedded nuts, the inner wall of the seat shell body is provided with seat shell studs that match the seat frame studs, and both sides of the inner wall of the seat shell body are respectively provided with seat shell positioning ribs that mate with the seat frame positioning slot in a snap-fit manner.

The above structure solves the positioning problem well, ensures good assembly effect, and realizes convenient assembly. The function of the shell embedded nut mounting holes: the screws pass through the plastic shell mounting holes and are fixed to the frame; in essence, it is a hole through which the screw connects the frame with the plastic shell of the headrest in a fixed manner. The same is true for the seat shell embedded nut mounting holes.

A method for manufacturing child safety seats, which is carried out as follows:

(I) Mold Component:

It includes the upper mold and the lower mold, and a mold cavity is formed by the upper mold and the lower mold. When molding, place the headrest frame or the seat frame in the lower mold and fix it to the lower mold, and then position the lower mold and the upper mold;

The parting line of the mold design is within the product assembly boundary line. When assembling, just cut off the excess fabric to avoid the fixing of the excess fabric;

A mold parting line is provided in the assembly boundary line, and the parallel distance between the mold parting line and the assembly boundary line is 12-15 mm;

The vertical distance from the assembly boundary line to the edge of the frame is 5-6 mm, and the horizontal distance from the assembly boundary line to the edge of the frame is 5-6 mm; the frame described here includes a headrest frame or a seat frame;

The projection area of the mold parting line of the mold structure on the parting surface is smaller than the projection area of the polyurethane foam part on the parting surface, which may cause difficulty in mold release. The headrest frame telescopic structure is adopted, which can solve the problem that the frame cannot be placed in the lower mold;

(II) Selection of Headrest Frame or Seat Frame Material:

The headrest frame or the seat frame material is one or a mixture of metal materials, non-metal materials or natural materials;

(III) Composition of Headrest Polyurethane Soft Foam and Seat Polyurethane Soft Foam (by Mass Part):

Polyol composition CW 5585/103 C-A: 10 parts, isocyanate composition CW 5585/102 C-B: 5-7 parts;

(IV) Surface Layer Selection:

The surface layer material is fabric or leather or a combination thereof, and the covering material has no stitches, and its surface is smooth with touch and physiological comfort;

Through treatment with the "three-proofing" technology, the surface material has excellent oil repellency, superior water repellency, remarkable dry stain resistance, and excellent washing fastness, making the use and maintenance of the safety seat more convenient and easy;

To achieve the air tightness requirements, the TPU film is usually laminated on the back side of the fabric;

The TPU film is featured by air tightness, softness, high resilience, high tensile strength and firm adhesion, and the thickness is selected from 0.05 to 0.08 mm; hot melt adhesive is sprayed on the back side of the fabric, then the back side is coated with the TPU film, and they are bonded through a high temperature of 150 degrees Celsius and rolling to form the composite of fabric and film, so that the composite has air tightness;

① Selection and Treatment of Fabric when the Surface Material is Fabric:

When foaming, the fabric needs to be vacuum-stretched on the mold, so the fabric needs to be airtight and has good ductility;

The fabric used is usually a double-layer fabric made of two high-strength and high-elastic materials (that is, 95% 70 D polyester and 5% 40 D spandex) knitted with a 36-needle double-sided circular knitting machine;

After manufacturing and setting, the fabric has the warp and weft ductility, good hand feeling, high strength, good elasticity, pilling resistance, wrinkle resistance, etc. It not only meets the production requirements of ductility and stretching, but also improves the comfort of the safety seat;

The weight of the fabric is generally 370 g/m$^2$;

The "three-proofing" fabric has outstanding oil repellency, which prevents oily stains from penetrating into and entering the interior of the fabric, maintains long-lasting cleanliness of the surface covering layer that is exposed outside and often in contact with children, and reduces washing times; with superior water repellency, the surface covering layer of the seat has excellent water-repellent effect and prevents water-soluble dirt staining, making the seat not easily soiled by milk, children's perspiration or saliva; with significant dry stain resistance, surface dust and dry stains are easy to shake off and brush off; with excellent washability and dry-cleaning resistance, the fabric can maintain high protection performance after being washed, ironed and dried many times;

After dyeing the fabric, remove all processing aids, such as wetting agents, dyes, slurry residues, softeners and other surfactants, and then carry out the impregnation process; add 20-60 g/l CP-SLA and 0.5 g/l W-DN additives into the groove, then impregnate the fabric in the groove of the setting machine at the temperature of 20 degrees Celsius, dry the fabric fast at the drying temperature of 110-170 degrees Celsius, and carry out a series of related processes such as napping, sanding, mechanical finishing, baking and steaming, so that the fabric has superior water repellency, significant dry staining resistance, good oil repellency and other advantages;

② Selection and Treatment of Leather when the Surface Material is Leather:

The surface material can be leather, including real leather and artificial leather; The leather surface material is fine, exquisite, elegant, warm, full in appearance, windproof and breathable. It has a certain degree of water resistance and its another advantage is good wear resistance. When leather is used as the surface covering layer, the seat is not only aesthetic and decent with excellent hand feeling and comfort, but also easier to maintain and clean;

Due to its lack of ductility, the leather is not suitable for direct foam molding. The process of compounding high-elastic knitted fabric with the back side of leather can retain the appearance advantages and characteristics of the leather; meanwhile, the added high elasticity satisfies production requirements;

Due to the scarcity and limited designs and colors of real leather, we can also use composite artificial leather instead of leather; composite artificial leather includes TPU, PU and PVC; according to design needs, two or more layers of PU, PU or PVC are compounded with hot melt glue, or the artificial leather is used as the surface layer, the fiber fabric is used as the bottom layer, and the two layers are glued together; to use artificial leather instead of real leather as the surface covering layer can not only replace high-quality natural leather products in a large amount and save plenty of natural leather resources, costs and energy consumption, but also give full play to the advantages of artificial leather, such as bright color, diversified patterns and styles, beautiful appearance, high tensile strength, high compressive strength, wear resistance, small deformation, good flexibility, and protection against moisture, dust and mildew, thus greatly facilitating the maintenance, cleaning and use of safety seats, and increasing the life cycle of the product;

The production includes the following steps:

I. Take a single layer of soft leather, which is finished to form the surface layer of the composite leather;

II. Take another layer of leather or fiber fabric matching the size of the surface leather layer, apply a layer of hot melt adhesive to the back side of the surface leather layer, and feed the adhesive side of the leather and the carbon fiber fabric into the press roller for press forming to form composite leather; the number of layers to be composited can be selected according to requirements;

III. Finishing;

According to the product design requirements, the leather thickness is 0.4 mm-2 mm, and the tensile load of the leather in each direction is greater than 180N; the tearing load in each direction is greater than 9N; the density requirement is greater than 900 g/m$^2$; the elongation at break of the leather is greater than 350%;

(V) Assembly:

According to the structural requirements of the child safety seat, the composite material composed of the surface layer material, the soft polyurethane foam and the frame is considered as a part assembly, which is installed on the frame parts of the child safety seat or directly attached to the shell to form a child safety seat.

Therefore, a child safety seat and its manufacturing process of this invention have the advantages of compact structure, excellent supporting performance and good use effect.

DETAILED DESCRIPTION OF THE EMBODIMENT

The technical solution of this invention will be further specifically described below by way of embodiments and with reference to the accompanying drawings.

Embodiment 1

Figure 1:
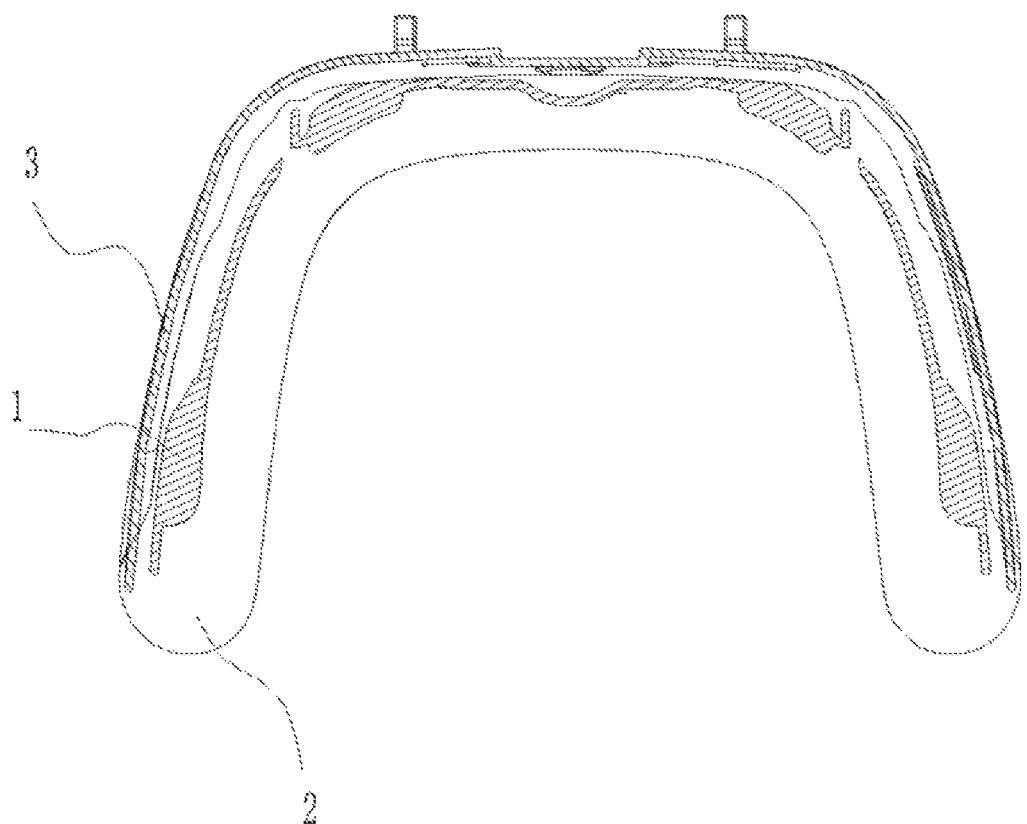
FIG. 1 shows a schematic view of this invention.
Figure 2:
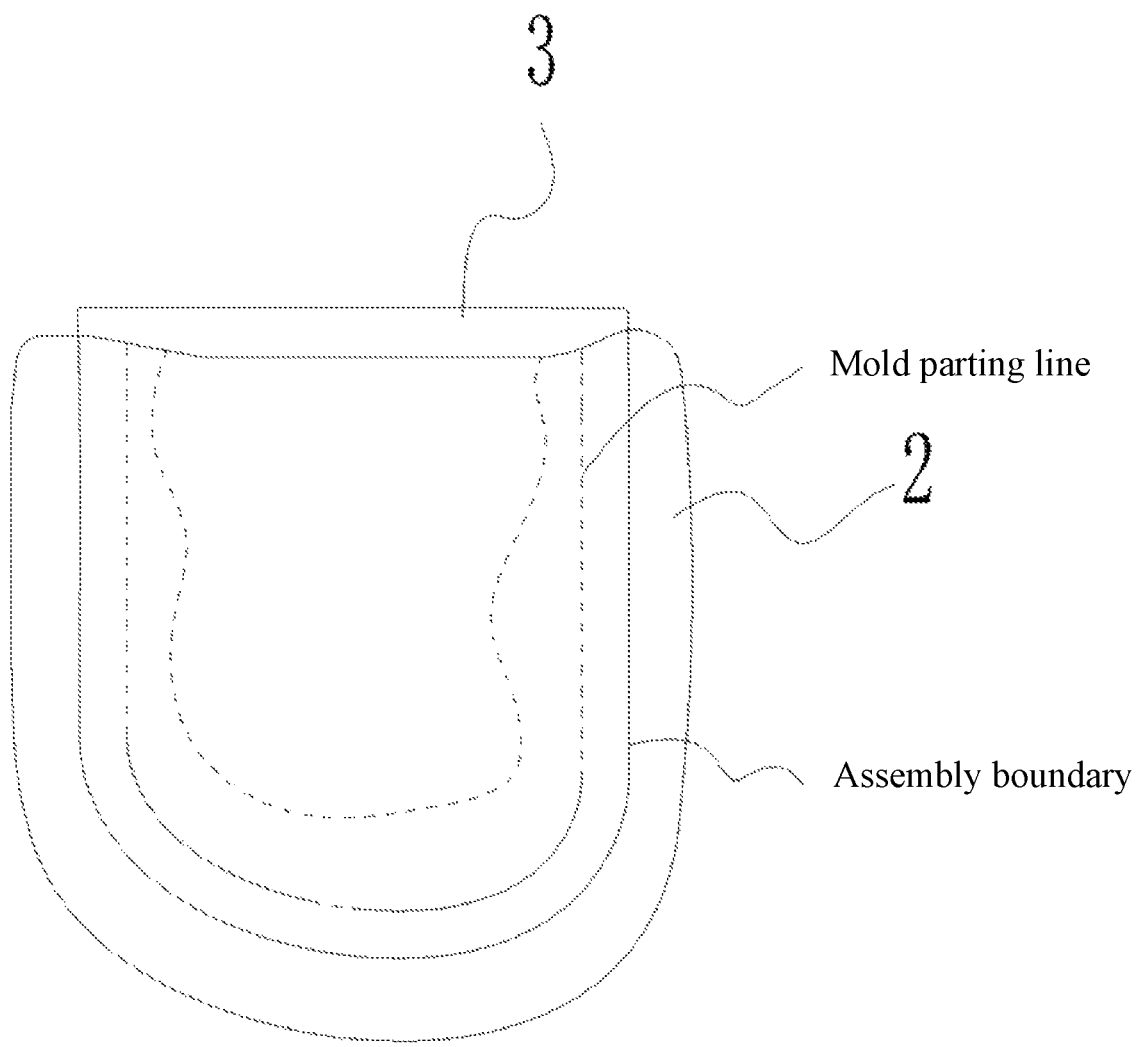
FIG. 2 shows a schematic view of the mold parting line in this invention.
Figure 3:
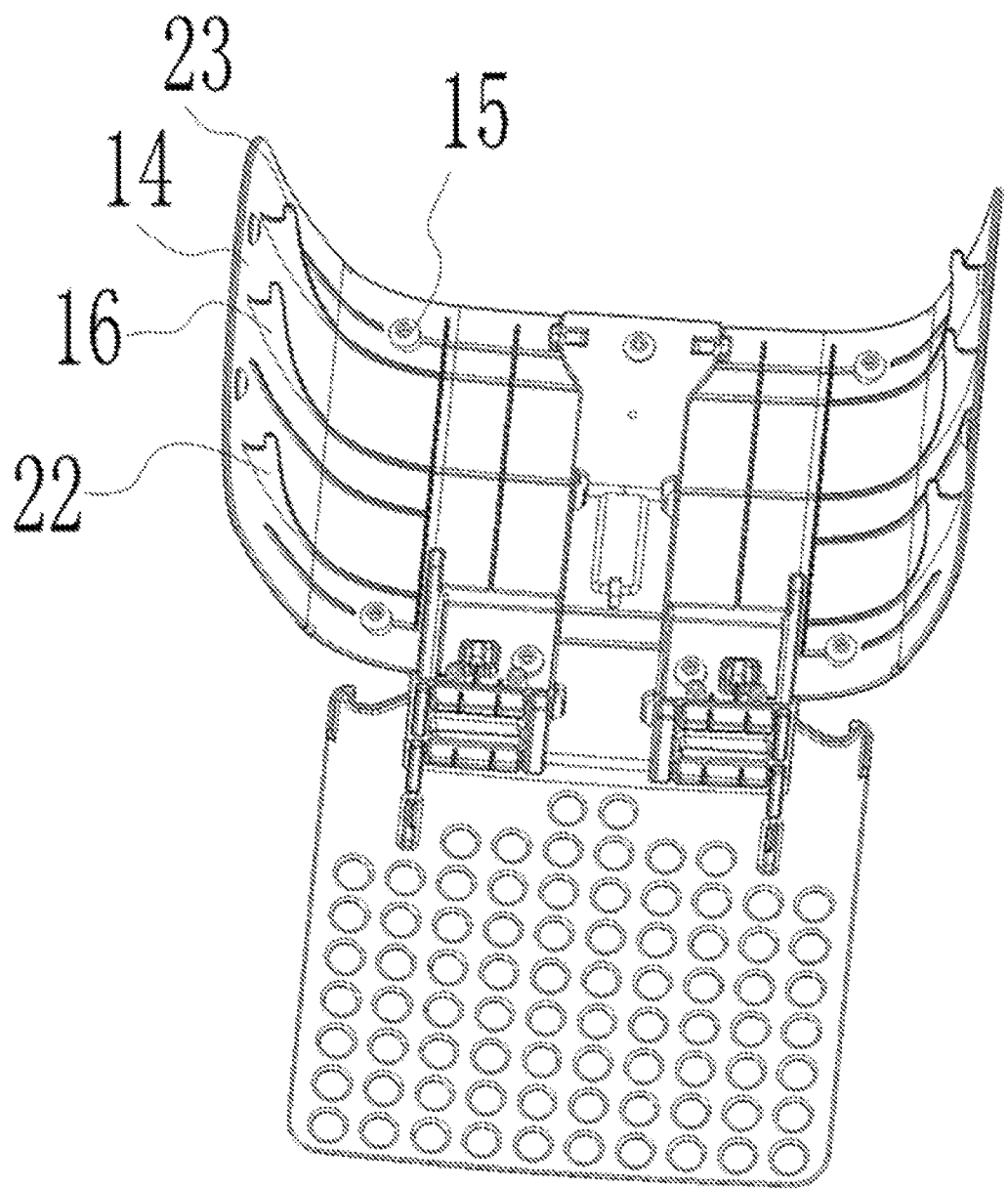
FIG. 3 shows a schematic view of the headrest frame in this invention.
Figure 4:
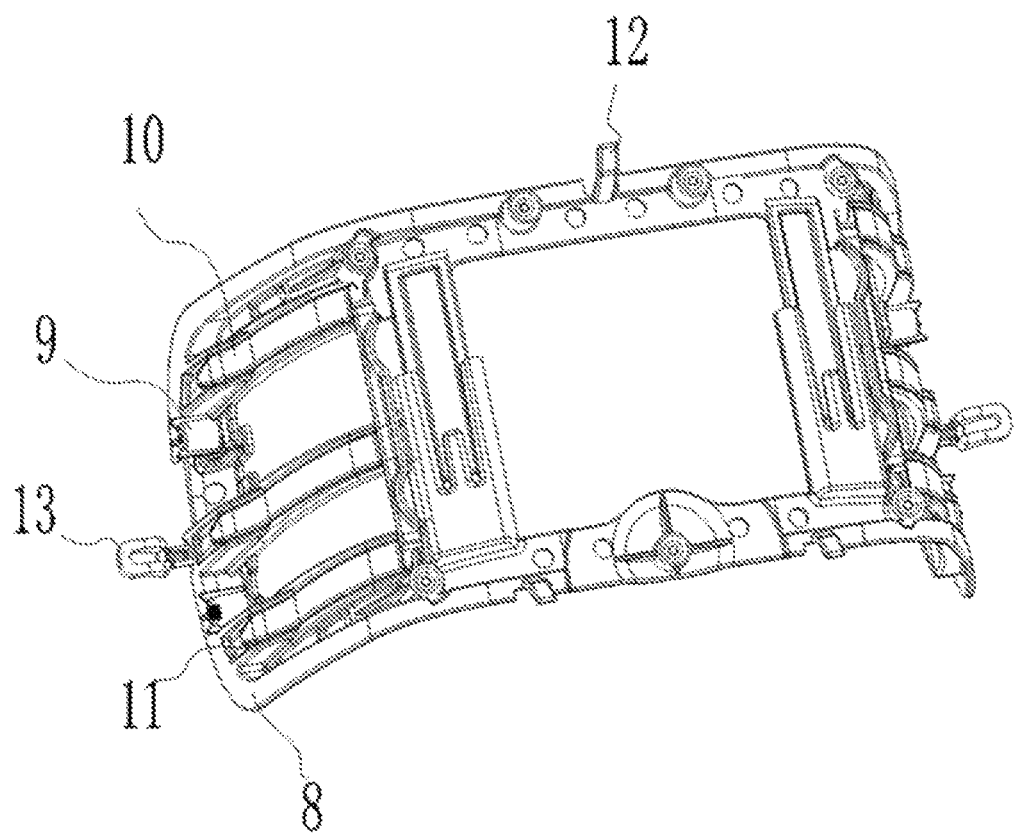
FIG. 4 shows a schematic view of the headrest shell in this invention.
Figure 5:
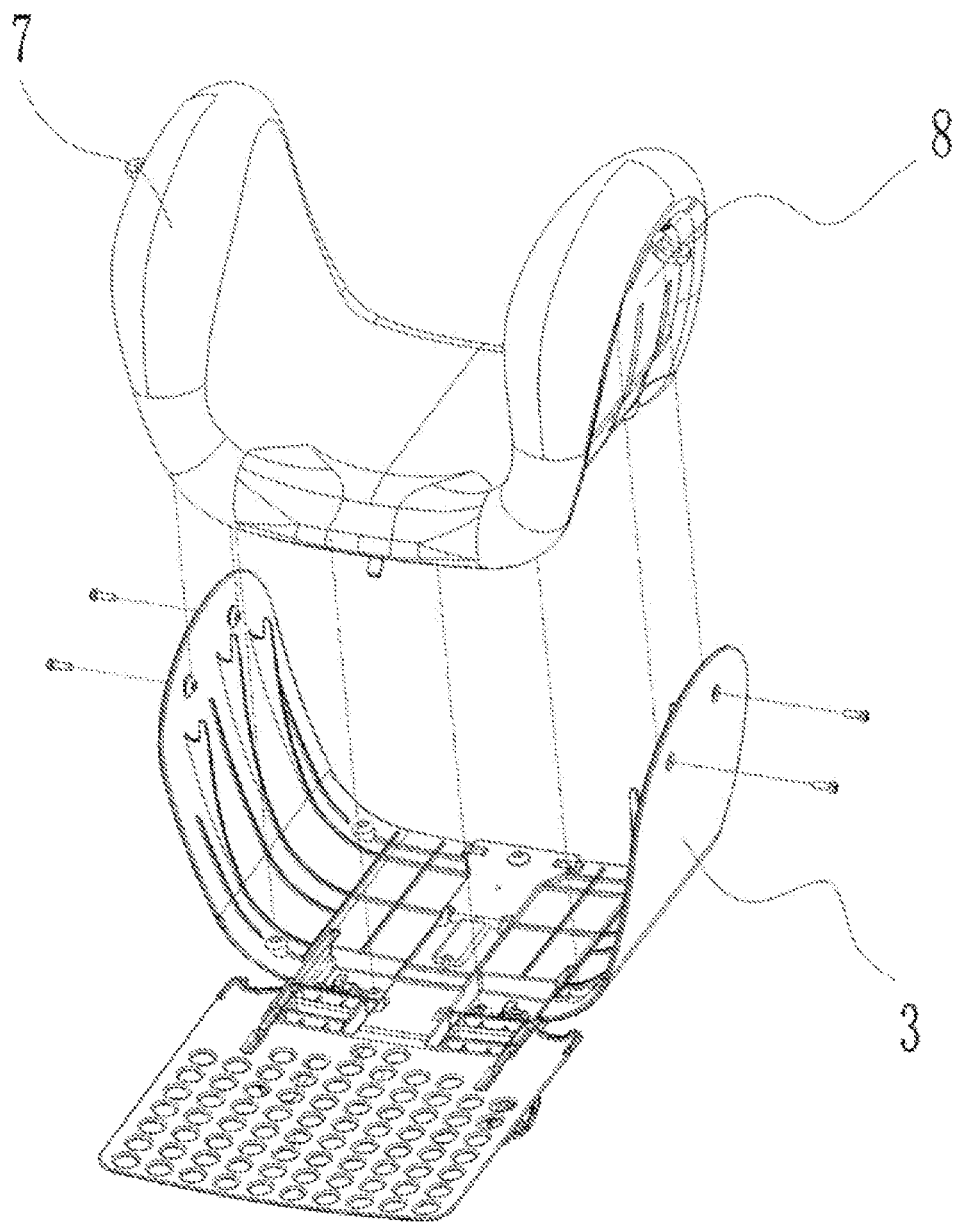
FIG. 5 shows a schematic view of the headrest frame assembly in this invention.
Figure 6:
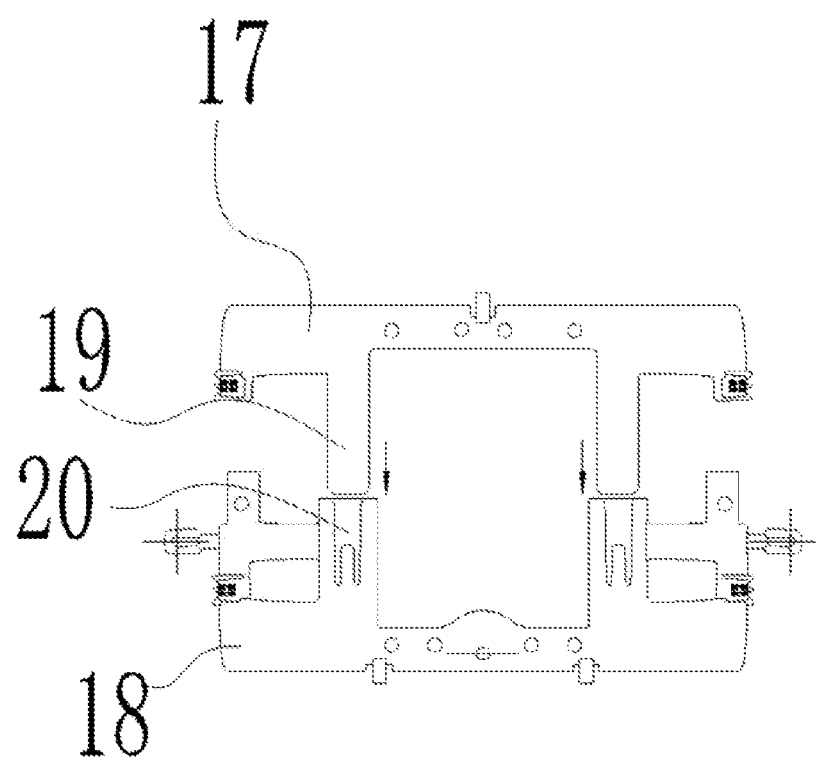
FIG. 6 shows a schematic view of the disengagement structure of the split type headrest frame in this invention.
Figure 7:
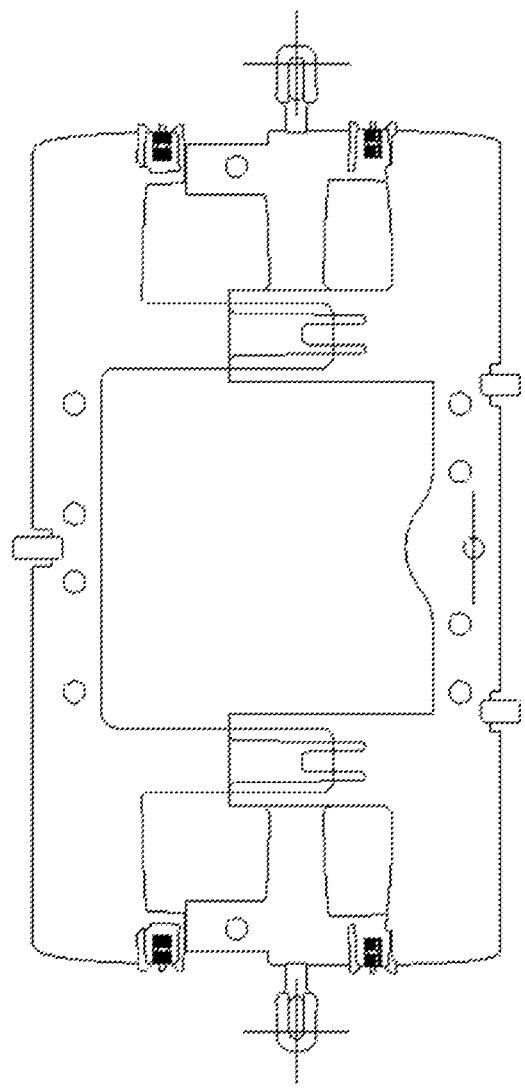
FIG. 7 shows a schematic view of the engagement structure of the split type headrest frame in this invention.
Figure 8:
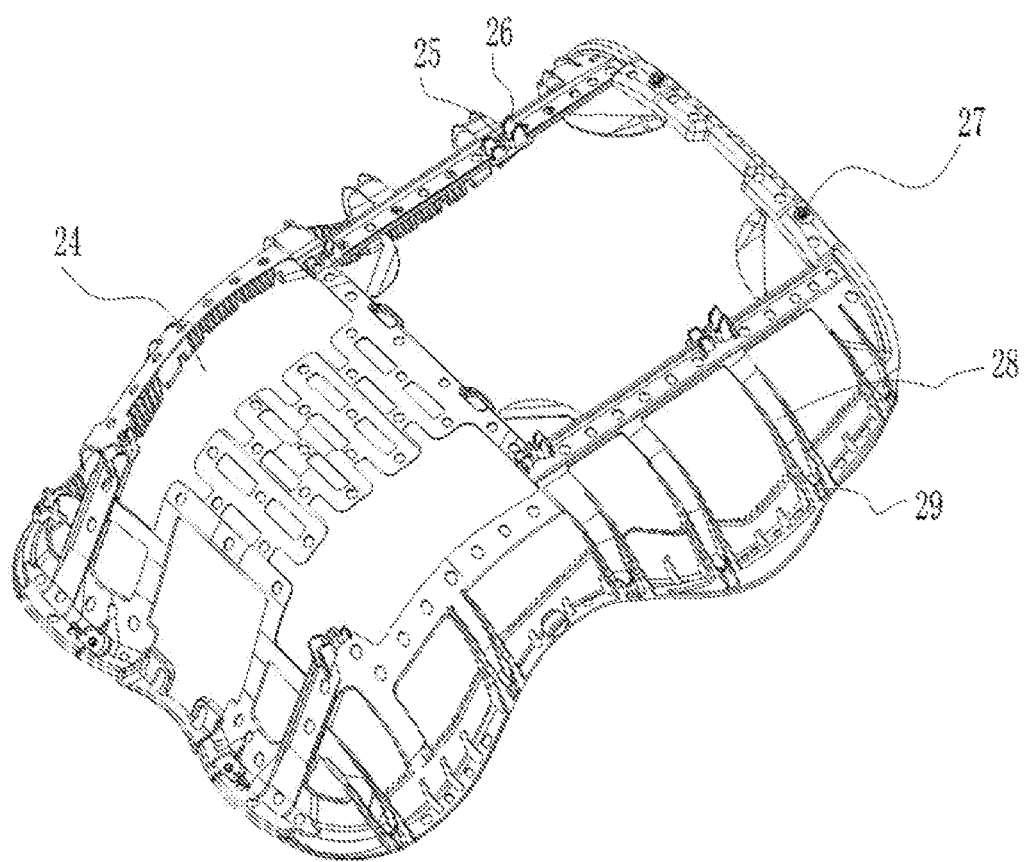
FIG. 8 shows a schematic view of the seat frame in this invention.
Figure 9:
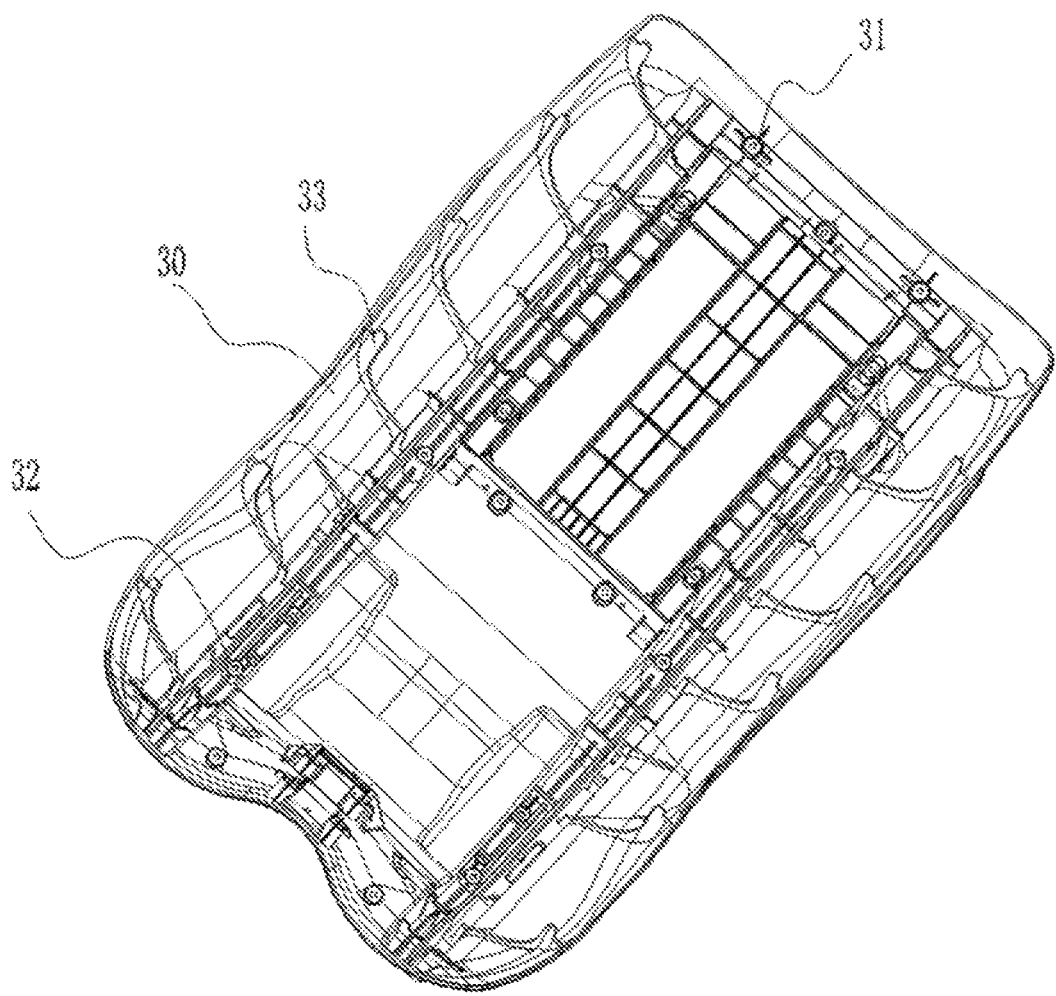
FIG. 9 shows a schematic view of the seat shell in this invention.
Figure 10:
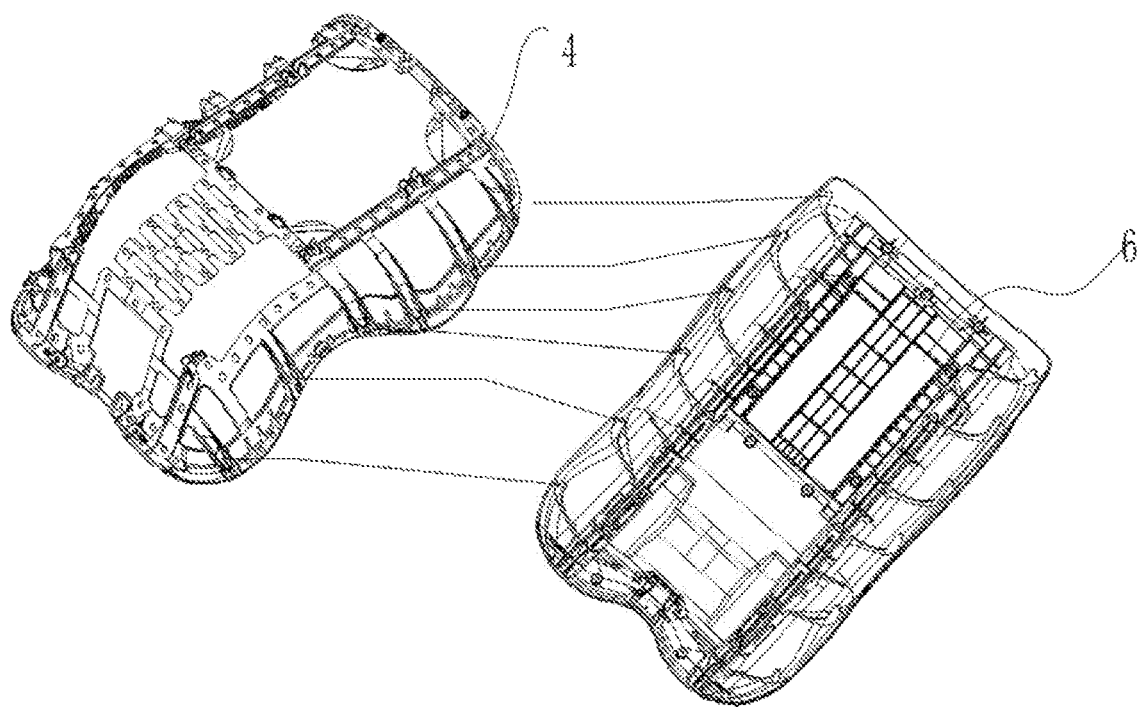
FIG. 10 shows a schematic view of the seat frame assembly in this invention.

As shown in FIGS. 1, 2, 3, 4, 5, 6, 7, 8, 9 and 10, a child safety seat comprising a headrest frame assembly and a seat frame assembly, and the seat frame assembly is matedly connected with the headrest frame assembly;

The headrest frame assembly includes a headrest frame 1, the inner wall of the headrest frame 1 is provided with headrest polyurethane soft foam 2, the headrest polyurethane soft foam 2 extends toward the outer wall of both sides of the headrest frame 1 to form an everted rim, and the outer wall of the headrest frame 1 is provided with a headrest shell 3;

The seat frame assembly includes a seat frame 4, the inner wall of the seat frame 4 is provided with seat polyurethane soft foam, the seat polyurethane soft foam extends toward the outer wall of both sides of the seat frame 4 to form an everted rim, and the outer wall of the seat frame 4 is provided with a seat shell 6;

Both the headrest polyurethane soft foam 2 and the seat polyurethane soft foam are covered with a surface layer 7.

The headrest frame 1 comprises a headrest frame body 8 distributed in a "U" shape, the headrest frame body 8 is divided into an integrated headrest frame body or a split headrest frame body, the left side, the middle and the right side of the outer wall of the headrest frame body 8 are respectively provided with a plurality of headrest frame embedded studs 9, the left and right sides of the outer wall of the headrest frame body 8 are respectively provided with a plurality of headrest curved positioning ribs 10, the outer side of the headrest curved positioning ribs 10 is provided with a headrest positioning slot 11, the upper side of the middle part of the outer wall of the headrest frame body 8 is provided with a mold positioning rod 12 protruding outwardly and obliquely, and the left and right sides of the headrest frame body 8 are respectively provided with snap-in positioning pieces 13;

The headrest shell 3 includes a headrest shell body 14 distributed in a "U" shape, the inner wall of the headrest shell body 14 is provided with shell embedded nut mounting holes 15 that match the embedded studs 9 of the headrest frame, and the left and right sides of the inner wall of the headrest shell body 14 are respectively provided with shell positioning ribs 16 that match the headrest positioning slot 11.

The split type headrest frame body comprises an upper headrest frame body 17 and a lower headrest frame body 18, the upper headrest frame body 17 is provided with an insertion rod 19, the lower headrest frame body 18 is provided with a slot 20, the insertion rod 19 is inserted downward into the slot 20, and the contact surface of the bottom of the upper headrest frame body 17 is in movable contact with the contact surface of the bottom of the lower headrest frame body 18.

The shell positioning ribs 16 comprise curved shell positioning ribs 22, the outer side of the curved shell positioning ribs 22 is provided with an outwardly protruding curved shell positioning head 23, and the curved shell positioning head 23 mates with the headrest positioning slot 11 in a snap-fit manner.

The seat frame 4 comprises a seat frame body 24 distributed in a " " shape, the middle of the back side of the seat frame body 24 is provided with a plurality of continuously distributed seat frame studs 25, the edge of the seat frame studs 25 is provided with a plurality of seat frame positioning ribs 26 fixed to the seat frame body 24, and the upper and lower parts of the middle of the back side of the seat frame body 24 are respectively provided with seat frame embedded nuts 27; the side walls of the back side of the seat frame body 24 are respectively provided with a plurality of curved seat frame positioning ribs 28, and the outer side of the curved seat frame positioning ribs 28 is provided with a seat frame positioning slot 29;

The seat shell 6 includes a seat shell body 30 distributed in a " " shape, the inner wall of the seat shell body 30 is provided with seat shell embedded nut mounting holes 31 that match the seat frame embedded nuts 27, the inner wall of the seat shell body 30 is provided with seat shell studs 32 that match the seat frame studs 25, and both sides of the inner wall of the seat shell body 30 are respectively provided with seat shell positioning ribs 33 that mate with the seat frame positioning slot 29 in a snap-fit manner.

A method for manufacturing child safety seats, which is carried out as follows:

(I) Mold Component:

It includes the upper mold and the lower mold, and a mold cavity is formed by the upper mold and the lower mold. When molding, place the headrest frame or the seat frame in the lower mold and fix it to the lower mold, and then position the lower mold and the upper mold;

The parting line of the mold design is within the product assembly boundary line. When assembling, just cut off the excess fabric to avoid the fixing of the excess fabric;

A mold parting line is provided in the assembly boundary line, and the parallel distance between the mold parting line and the assembly boundary line is 12 mm;

The vertical distance from the assembly boundary line to the edge of the frame is 5 mm, and the horizontal distance from the assembly boundary line to the edge of the frame is 5 mm; the frame described here includes a headrest frame or a seat frame;

The projection area of the mold parting line of the mold structure on the parting surface is smaller than the projection area of the polyurethane foam part on the parting surface, which may cause difficulty in mold release. The headrest frame telescopic structure is adopted, which can solve the problem that the frame cannot be placed in the lower mold;

(II) Selection of Headrest Frame or Seat Frame Material:

The headrest frame or the seat frame material is one or a mixture of metal materials, non-metal materials or natural materials;

(III) Composition of Headrest Polyurethane Soft Foam and Seat Polyurethane Soft Foam (by Mass Part):

Polyol composition CW 5585/103 C-A: 10 parts, isocyanate composition CW 5585/102 C-B: 5 parts;

(IV) Surface Layer Selection:

The surface layer material is fabric or leather or a combination thereof, and the covering material has no stitches, and its surface is smooth with touch and physiological comfort;

Through treatment with the "three-proofing" technology, the surface material has excellent oil repellency, superior water repellency, remarkable dry stain resistance, and excellent washing fastness, making the use and maintenance of the safety seat more convenient and easy;

To achieve the air tightness requirements, the TPU film is usually laminated on the back side of the fabric;

The TPU film is featured by air tightness, softness, high resilience, high tensile strength and firm adhesion, and the thickness of 0.05 mm is selected; hot melt adhesive is sprayed on the back side of the fabric, then the back side is coated with the TPU film, and they are bonded through a high temperature of 150 degrees Celsius and rolling to form the composite of fabric and film, so that the composite has air tightness;

① Selection and Treatment of Fabric when the Surface Material is Fabric:

When foaming, the fabric needs to be vacuum-stretched on the mold, so the fabric needs to be airtight and has good ductility;

The fabric used is usually a double-layer fabric made of two high-strength and high-elastic materials (that is, 95% 70 D polyester and 5% 40 D spandex) knitted with a 36-needle double-sided circular knitting machine;

After manufacturing and setting, the fabric has the warp and weft ductility, good hand feeling, high strength, good elasticity, pilling resistance, wrinkle resistance, etc. It not only meets the production requirements of ductility and stretching, but also improves the comfort of the safety seat;

The weight of the fabric is generally 370 $g/m^2$;

The "three-proofing" fabric has outstanding oil repellency, which prevents oily stains from penetrating into and entering the interior of the fabric, maintains long-lasting cleanliness of the surface covering layer that is exposed outside and often in contact with children, and reduces washing times; with superior water repellency, the surface covering layer of the seat has excellent water-repellent effect and prevents water-soluble dirt staining, making the seat not easily soiled by milk, children's perspiration or saliva; with significant dry stain resistance, surface dust and dry stains are easy to shake off and brush off; with excellent washability and dry-cleaning resistance, the fabric can maintain high protection performance after being washed, ironed and dried many times;

After dyeing the fabric, remove all processing aids, such as wetting agents, dyes, slurry residues, softeners and other surfactants, and then carry out the impregnation process; add 20 g/l CP-SLA and 0.5 g/l W-DN additives into the groove, then impregnate the fabric in the groove of the setting machine at the temperature of 20 degrees Celsius, dry the fabric fast at the drying temperature of 110 degrees Celsius, and carry out a series of related processes such as napping, sanding, mechanical finishing, baking and steaming, so that the fabric has superior water repellency, significant dry staining resistance, good oil repellency and other advantages;

② Selection and Treatment of Leather when the Surface Material is Leather:

The surface material can be leather, including real leather and artificial leather;

The leather surface material is fine, exquisite, elegant, warm, full in appearance, windproof and breathable. It has a certain degree of water resistance and its another advantage is good wear resistance. When leather is used as the surface covering layer, the seat is not only aesthetic and decent with excellent hand feeling and comfort, but also easier to maintain and clean;

Due to its lack of ductility, the leather is not suitable for direct foam molding. The process of compounding high-elastic knitted fabric with the back side of leather can retain the appearance advantages and characteristics of the leather; meanwhile, the added high elasticity satisfies production requirements;

Due to the scarcity and limited designs and colors of real leather, we can also use composite artificial leather instead of leather; composite artificial leather includes TPU, PU and PVC; according to design needs, two or more layers of PU, PU or PVC are compounded with hot melt glue, or the artificial leather is used as the surface layer, the fiber fabric is used as the bottom layer, and the two layers are glued together; to use artificial leather instead of real leather as the surface covering layer can not only replace high-quality natural leather products in a large amount and save plenty of natural leather resources, costs and energy consumption, but also give full play to the advantages of artificial leather, such as bright color, diversified patterns and styles, beautiful appearance, high tensile strength, high compressive strength, wear resistance, small deformation, good flexibility, and protection against moisture, dust and mildew, thus greatly facilitating the maintenance, cleaning and use of safety seats, and increasing the life cycle of the product;

The production includes the following steps:

I. Take a single layer of soft leather, which is finished to form the surface layer of the composite leather;

II. Take another layer of leather or fiber fabric matching the size of the surface leather layer, apply a layer of hot melt adhesive to the back side of the surface leather layer, and feed the adhesive side of the leather and the carbon fiber fabric into the press roller for press forming to form composite leather; the number of layers to be composited can be selected according to requirements;

III. Finishing;

According to the product design requirements, the leather thickness is 0.4 mm, and the tensile load of the leather in each direction is greater than 180N; the tearing load in each direction is greater than 9N; the density requirement is greater than 900 g/m$^2$; the elongation at break of the leather is greater than 350%;

(V) Assembly:

According to the structural requirements of the child safety seat, the composite material composed of the surface layer material, the soft polyurethane foam and the frame is considered as a part assembly, which is installed on the frame parts of the child safety seat or directly attached to the shell to form a child safety seat.

Embodiment 2

A method for manufacturing child safety seats, which is carried out as follows:

(I) Mold Component:

It includes the upper mold and the lower mold, and a mold cavity is formed by the upper mold and the lower mold. When molding, place the headrest frame or the seat frame in the lower mold and fix it to the lower mold, and then position the lower mold and the upper mold;

The parting line of the mold design is within the product assembly boundary line. When assembling, just cut off the excess fabric to avoid the fixing of the excess fabric;

A mold parting line is provided in the assembly boundary line, and the parallel distance between the mold parting line and the assembly boundary line is 14 mm;

The vertical distance from the assembly boundary line to the edge of the frame is 5.5 mm, and the horizontal distance from the assembly boundary line to the edge of the frame is 5.5 mm; the frame described here includes a headrest frame or a seat frame;

The projection area of the mold parting line of the mold structure on the parting surface is smaller than the projection area of the polyurethane foam part on the parting surface, which may cause difficulty in mold release. The headrest frame telescopic structure is adopted, which can solve the problem that the frame cannot be placed in the lower mold;

(II) Selection of Headrest Frame or Seat Frame Material:

The headrest frame or the seat frame material is one or a mixture of metal materials, non-metal materials or natural materials;

(III) Composition of Headrest Polyurethane Soft Foam and Seat Polyurethane Soft Foam (by Mass Part):

Polyol composition CW 5585/103 C-A: 10 parts, isocyanate composition CW 5585/102 C-B: 6 parts;

(IV) Surface Layer Selection:

The surface layer material is fabric or leather or a combination thereof, and the covering material has no stitches, and its surface is smooth with touch and physiological comfort;

Through treatment with the "three-proofing" technology, the surface material has excellent oil repellency, superior water repellency, remarkable dry stain resistance, and excellent washing fastness, making the use and maintenance of the safety seat more convenient and easy;

To achieve the air tightness requirements, the TPU film is usually laminated on the back side of the fabric;

The TPU film is featured by air tightness, softness, high resilience, high tensile strength and firm adhesion, and the thickness of 0.06 mm is selected; hot melt adhesive is sprayed on the back side of the fabric, then the back side is coated with the TPU film, and they are bonded through a high temperature of 150 degrees Celsius and rolling to form the composite of fabric and film, so that the composite has air tightness;

① Selection and treatment of fabric when the surface material is fabric:

When foaming, the fabric needs to be vacuum-stretched on the mold, so the fabric needs to be airtight and has good ductility;

The fabric used is usually a double-layer fabric made of two high-strength and high-elastic materials (that is, 95% 70 D polyester and 5% 40 D spandex) knitted with a 36-needle double-sided circular knitting machine;

After manufacturing and setting, the fabric has the warp and weft ductility, good hand feeling, high strength, good elasticity, pilling resistance, wrinkle resistance, etc. It not only meets the production requirements of ductility and stretching, but also improves the comfort of the safety seat;

The weight of the fabric is generally 370 g/m$^2$;

The "three-proofing" fabric has outstanding oil repellency, which prevents oily stains from penetrating into and entering the interior of the fabric, maintains long-lasting cleanliness of the surface covering layer that is exposed outside and often in contact with children, and reduces washing times; with superior water repellency, the surface covering layer of the seat has excellent water-repellent effect and prevents water-soluble dirt staining, making the seat not easily soiled by milk, children's perspiration or saliva; with significant dry stain resistance, surface dust and dry stains are easy to shake off and brush off; with excellent washability and dry-cleaning resistance, the fabric can maintain high protection performance after being washed, ironed and dried many times;

After dyeing the fabric, remove all processing aids, such as wetting agents, dyes, slurry residues, softeners and other surfactants, and then carry out the impregnation process; add 40 g/l CP-SLA and 0.5 g/l W-DN additives into the groove, then impregnate the fabric in the groove of the setting machine at the temperature of 20 degrees Celsius, dry the fabric fast at the drying temperature of 150 degrees Celsius, and carry out a series of related processes such as napping, sanding, mechanical finishing, baking and steaming, so that the fabric has superior water repellency, significant dry staining resistance, good oil repellency and other advantages;

② Selection and Treatment of Leather when the Surface Material is Leather:

The surface material can be leather, including real leather and artificial leather;

The leather surface material is fine, exquisite, elegant, warm, full in appearance, windproof and breathable. It has a certain degree of water resistance and its another advantage is good wear resistance. When leather is used as the surface covering layer, the seat is not only aesthetic and decent with excellent hand feeling and comfort, but also easier to maintain and clean;

Due to its lack of ductility, the leather is not suitable for direct foam molding. The process of compounding high-elastic knitted fabric with the back side of leather can retain the appearance advantages and characteristics of the leather; meanwhile, the added high elasticity satisfies production requirements;

Due to the scarcity and limited designs and colors of real leather, we can also use composite artificial leather instead of leather; composite artificial leather includes TPU, PU and PVC; according to design needs, two or more layers of PU, PU or PVC are compounded with hot melt glue, or the artificial leather is used as the surface layer, the fiber fabric is used as the bottom layer, and the two layers are glued together; to use artificial leather instead of real leather as the surface covering layer can not only replace high-quality natural leather products in a large amount and save plenty of natural leather resources, costs and energy consumption, but also give full play to the advantages of artificial leather, such as bright color, diversified patterns and styles, beautiful appearance, high tensile strength, high compressive strength, wear resistance, small deformation, good flexibility, and protection against moisture, dust and mildew, thus greatly facilitating the maintenance, cleaning and use of safety seats, and increasing the life cycle of the product;

The production includes the following steps:

I. Take a single layer of soft leather, which is finished to form the surface layer of the composite leather;

II. Take another layer of leather or fiber fabric matching the size of the surface leather layer, apply a layer of hot melt adhesive to the back side of the surface leather layer, and feed the adhesive side of the leather and the carbon fiber fabric into the press roller for press forming to form composite leather; the number of layers to be composited can be selected according to requirements;

III. Finishing;

According to the product design requirements, the leather thickness is 1 mm, and the tensile load of the leather in each direction is greater than 180N; the tearing load in each direction is greater than 9N; the density requirement is greater than 900 g/m$^2$; the elongation at break of the leather is greater than 350%;

(V) Assembly:

According to the structural requirements of the child safety seat, the composite material composed of the surface layer material, the soft polyurethane foam and the frame is considered as a part assembly, which is installed on the frame parts of the child safety seat or directly attached to the shell to form a child safety seat.

Embodiment 3

A method for manufacturing child safety seats, which is carried out as follows:

(I) Mold Component:

It includes the upper mold and the lower mold, and a mold cavity is formed by the upper mold and the lower mold. When molding, place the headrest frame or the seat frame in the lower mold and fix it to the lower mold, and then position the lower mold and the upper mold;

The parting line of the mold design is within the product assembly boundary line. When assembling, just cut off the excess fabric to avoid the fixing of the excess fabric;

A mold parting line is provided in the assembly boundary line, and the parallel distance between the mold parting line and the assembly boundary line is 15 mm;

The vertical distance from the assembly boundary line to the edge of the frame is 6 mm, and the horizontal distance from the assembly boundary line to the edge of the frame is 6 mm; the frame described here includes a headrest frame or a seat frame; The projection area of the mold parting line of the mold structure on the parting surface is smaller than the projection area of the polyurethane foam part on the parting surface, which may cause difficulty in mold release. The headrest frame telescopic structure is adopted, which can solve the problem that the frame cannot be placed in the lower mold;

(II) Selection of Headrest Frame or Seat Frame Material:

The headrest frame or the seat frame material is one or a mixture of metal materials, non-metal materials or natural materials;

(III) Composition of Headrest Polyurethane Soft Foam and Seat Polyurethane Soft Foam (by Mass Part):

Polyol composition CW 5585/103 C-A: 10 parts, isocyanate composition CW 5585/102 C-B: 7 parts;

(IV) Surface Layer Selection:

The surface layer material is fabric or leather or a combination thereof, and the covering material has no stitches, and its surface is smooth with touch and physiological comfort;

Through treatment with the "three-proofing" technology, the surface material has excellent oil repellency, superior water repellency, remarkable dry stain resistance, and excellent washing fastness, making the use and maintenance of the safety seat more convenient and easy;

To achieve the air tightness requirements, the TPU film is usually laminated on the back side of the fabric;

The TPU film is featured by air tightness, softness, high resilience, high tensile strength and firm adhesion, and the thickness of 0.08 mm is selected; hot melt adhesive is sprayed on the back side of the fabric, then the back side is coated with the TPU film, and they are bonded through a high temperature of 150 degrees Celsius and rolling to form the composite of fabric and film, so that the composite has air tightness;

① Selection and Treatment of Fabric when the Surface Material is Fabric:

When foaming, the fabric needs to be vacuum-stretched on the mold, so the fabric needs to be airtight and has good ductility;

The fabric used is usually a double-layer fabric made of two high-strength and high-elastic materials (that is, 95% 70 D polyester and 5% 40 D spandex) knitted with a 36-needle double-sided circular knitting machine;

After manufacturing and setting, the fabric has the warp and weft ductility, good hand feeling, high strength, good elasticity, pilling resistance, wrinkle resistance, etc. It not only meets the production requirements of ductility and stretching, but also improves the comfort of the safety seat;

The weight of the fabric is generally 370 g/m$^2$;

The "three-proofing" fabric has outstanding oil repellency, which prevents oily stains from penetrating into and entering the interior of the fabric, maintains long-lasting cleanliness of the surface covering layer that is exposed outside and often in contact with children, and reduces washing times; with superior water repellency, the surface covering layer of the seat has excellent water-repellent effect and prevents water-soluble dirt staining, making the seat not easily soiled by milk, children's perspiration or saliva; with significant dry stain resistance, surface dust and dry stains are easy to shake off and brush off; with excellent washability and dry-cleaning resistance, the fabric can maintain high protection performance after being washed, ironed and dried many times;

After dyeing the fabric, remove all processing aids, such as wetting agents, dyes, slurry residues, softeners and other surfactants, and then carry out the impregnation process; add 60 g/l CP-SLA and 0.5 g/l W-DN additives into the groove, then impregnate the fabric in the groove of the setting machine at the temperature of 20 degrees Celsius, dry the fabric fast at the drying temperature of 170 degrees Celsius, and carry out a series of related processes such as napping, sanding, mechanical finishing, baking and steaming, so that the fabric has superior water repellency, significant dry staining resistance, good oil repellency and other advantages;

② Selection and Treatment of Leather when the Surface Material is Leather:

The surface material can be leather, including real leather and artificial leather;

The leather surface material is fine, exquisite, elegant, warm, full in appearance, windproof and breathable. It has a certain degree of water resistance and its another advantage is good wear resistance. When leather is used as the surface covering layer, the seat is not only aesthetic and decent with excellent hand feeling and comfort, but also easier to maintain and clean;

Due to its lack of ductility, the leather is not suitable for direct foam molding. The process of compounding high-elastic knitted fabric with the back side of leather can retain the appearance advantages and characteristics of the leather; meanwhile, the added high elasticity satisfies production requirements;

Due to the scarcity and limited designs and colors of real leather, we can also use composite artificial leather instead of leather; composite artificial leather includes TPU, PU and PVC; according to design needs, two or more layers of PU, PU or PVC are compounded with hot melt glue, or the artificial leather is used as the surface layer, the fiber fabric is used as the bottom layer, and the two layers are glued together; to use artificial leather instead of real leather as the surface covering layer can not only replace high-quality natural leather products in a large amount and save plenty of natural leather resources, costs and energy consumption, but also give full play to the advantages of artificial leather, such as bright color, diversified patterns and styles, beautiful appearance, high tensile strength, high compressive strength, wear resistance, small deformation, good flexibility, and protection against moisture, dust and mildew, thus greatly facilitating the maintenance, cleaning and use of safety seats, and increasing the life cycle of the product;

The production includes the following steps:

I. Take a single layer of soft leather, which is finished to form the surface layer of the composite leather;

II. Take another layer of leather or fiber fabric matching the size of the surface leather layer, apply a layer of hot melt adhesive to the back side of the surface leather layer, and feed the adhesive side of the leather and the carbon fiber fabric into the press roller for press forming to form composite leather; the number of layers to be composited can be selected according to requirements;

III. Finishing;

According to the product design requirements, the leather thickness is 2 mm, and the tensile load of the leather in each direction is greater than 180N; the tearing load in each direction is greater than 9N; the density requirement is greater than 900 g/m$^2$; the elongation at break of the leather is greater than 350%;

(V) Assembly:

According to the structural requirements of the child safety seat, the composite material composed of the surface layer material, the soft polyurethane foam and the frame is considered as a part assembly, which is installed on the frame parts of the child safety seat or directly attached to the shell to form a child safety seat.

What is claimed is:

1. A child safety seat, comprising: a headrest frame assembly and a seat frame assembly, wherein, the seat frame assembly is matedly connected with the headrest frame assembly;

the headrest frame assembly includes a headrest frame, an inner wall of the headrest frame is provided with a headrest polyurethane soft foam, the headrest polyurethane soft foam extends toward an outer wall of both sides of the headrest frame to form an everted rim, and the outer wall of the headrest frame is provided with a headrest shell;

the seat frame assembly includes a seat frame, an inner wall of the seat frame is provided with a seat polyurethane soft foam, the seat polyurethane soft foam extends toward an outer wall of both sides of the seat frame to form an everted rim, and the outer wall of the seat frame is provided with a seat shell;

the headrest polyurethane soft foam and the seat polyurethane soft foam are covered with a surface layer;

wherein the headrest frame comprises a headrest frame body distributed in a "U" shape, the headrest frame body is divided into an integrated headrest frame body or a split headrest frame body; a left side, a middle and a right side of the outer wall of the headrest frame body are respectively provided with a plurality of headrest frame embedded studs; the left and the right sides of the outer wall of the headrest frame body are respectively provided with a plurality of headrest curved positioning ribs; the outer side of the headrest curved positioning ribs is provided with a headrest positioning slot; an upper side of the middle part of the outer wall of the headrest frame body is provided with a mold positioning rod protruding outwardly and obliquely; and the left and right sides of the headrest frame body are respectively provided with a snap-in positioning pieces;

the headrest shell includes a headrest shell body distributed in a "U" shape, the inner wall of the headrest shell body is provided with shell embedded nut mounting holes matching with the embedded studs of the headrest frame, and the left and right sides of the inner wall of the headrest shell body are respectively provided with shell positioning ribs matching with the headrest positioning slot.

2. The child safety seat according to claim 1, wherein the split type headrest frame body comprises an upper headrest frame body and a lower headrest frame body, the upper headrest frame body is provided with an insertion rod, the lower headrest frame body is provided with a slot, the insertion rod is inserted downward into the slot, and a contact surface of a bottom of the upper headrest frame body is in a movable contact with a contact surface of the bottom of the lower headrest frame body.

3. The child safety seat according to claim 1, wherein the shell positioning ribs comprise a curved shell positioning ribs, an outer side of the curved shell positioning ribs is provided with an outwardly protruding curved shell positioning head, and the curved shell positioning head mates with the headrest positioning slot in a snap-fit manner.

4. A child safety seat, comprising: a headrest frame assembly and a seat frame assembly, wherein, the seat frame assembly is matedly connected with the headrest frame assembly;
   the headrest frame assembly includes a headrest frame, an inner wall of the headrest frame is provided with a headrest polyurethane soft foam, the headrest polyurethane soft foam extends toward an outer wall of both sides of the headrest frame to form an everted rim, and the outer wall of the headrest frame is provided with a headrest shell;
   the seat frame assembly includes a seat frame, an inner wall of the seat frame is provided with a seat polyurethane soft foam, the seat polyurethane soft foam extends toward an outer wall of both sides of the seat frame to form an everted rim, and the outer wall of the seat frame is provided with a seat shell;
   the headrest polyurethane soft foam and the seat polyurethane soft foam are covered with a surface layer;
   wherein the seat frame comprises a seat frame body, the middle of the back side of the seat frame body is provided with a plurality of continuously distributed seat frame studs, an edge of the seat frame studs is provided with a plurality of seat frame positioning ribs fixed to the seat frame body, and the upper and lower parts of the middle of the back side of the seat frame body are respectively provided with seat frame embedded nuts; the side walls of the back side of the seat frame body are respectively provided with a plurality of curved seat frame positioning ribs, and an outer side of the plurality of curved seat frame positioning ribs is provided with a seat frame positioning slot;
   the seat shell comprises a seat shell body, an inner wall of the seat shell body is provided with seat shell embedded nut mounting holes matching with the seat frame embedded nuts, the inner wall of the seat shell body is provided with seat shell studs matching with the seat frame studs, and both sides of the inner wall of the seat shell body are respectively provided with seat shell positioning ribs, wherein the seat shell positioning ribs mate with the seat frame positioning slot in a snap-fit manner.

5. A method for manufacturing the child safety seat according to claim 1, comprising:
   (I) preparing a mold component:
   forming a mold cavity by an upper mold and a lower mold; during molding, placing the headrest frame or the seat frame in the lower mold and fixing the headrest frame or the seat frame to the lower mold, and then positioning the lower mold and the upper mold;
   wherein, a parting line of a mold design is within a product assembly boundary line and during assembling, cutting off an excess fabric to avoid fixing of the excess fabric;
   wherein, a parallel distance between the parting line of the mold design and the product assembly boundary line is 12-15 mm;
   a vertical distance from the product assembly boundary line to an edge of the headrest frame or the seat frame is 5-6 mm, and a horizontal distance from the product assembly boundary line to the edge of the headrest frame or the seat frame is 5-6 mm;
   a projection area of the parting line of the mold design on a parting surface is smaller than a projection area of a polyurethane foam part on the parting surface, wherein, the parting surface causes difficulty in mold release; adopting a headrest frame telescopic structure;
   wherein, the headrest frame or the seat frame is made of one or a mixture of metal materials, non-metal materials or natural materials;
   wherein, the polyurethane soft foam includes 10 parts of polyol composition CW 5585/103 C-A by mass and 5-7 parts of isocyanate composition CW 5585/102 C-B by mass;
   wherein, a surface layer material is a fabric or a leather or a combination thereof, and a covering material has no stitches;
   laminating a TPU film on a back side of the fabric;
   wherein, a thickness of the TPU film is from 0.05 to 0.08 mm; wherein a hot melt adhesive is sprayed on the back side of the fabric, then the back side is coated with the TPU film, and the fabric and the TPU film are bonded through a high temperature of 150 degrees Celsius and rolling to form a composite of the fabric and the TPU film;
   if the surface material is the fabric, performing selection and treatment of the fabric:
   when foaming, vacuum-stretching the fabric on the mold to make the fabric airtight and ductile;
   wherein, the fabric is a double-layer fabric made of 95% 70 D polyester and 5% 40 D spandex knitted with a 36-needle double-sided circular knitting machine;
   after dyeing the fabric, removing all processing aids, including wetting agents, dyes, slurry residues, softeners and other surfactants, and then carrying out an impregnation process; adding 20-60 g/l CP-SLA and 0.5 g/l W-DN additives into the groove, then impregnating the fabric in the groove of the setting machine at a temperature of 20 degrees Celsius, drying the fabric at a drying temperature of 110-170 degrees Celsius, and performing napping, sanding, mechanical finishing, baking and steaming;
   if the surface material is the leather, performing selection and treatment of the leather:
   compounding an elastic knitted fabric with the leather
   wherein, the leather is a composite artificial leather, the leather comprises TPU, PU and PVC; wherein, two or more layers of TPU, PU or PVC are compounded with melt glue, or the artificial leather is used as a surface layer, the fiber fabric is used as a bottom layer, and the surface layer and the bottom layer are glued together;
   the production includes the following steps:
   1. taking a single layer of soft leather, to form the surface layer of the composite leather;
   2. taking another layer of the leather or the fiber fabric matching the size of the surface leather layer, applying a layer of the hot melt adhesive to the back side of the surface leather layer, and feeding the adhesive side of the leather and the fiber fabric into a press roller for press forming to form the composite leather;
   3. finishing;
   wherein, a thickness of the leather is 0.4 mm-2 mm, and a tensile load of the leather in each direction is greater than 180N; a tearing load in each direction is greater than 9N; a density is greater than 900 g/m$^2$; an elongation at break of the leather is greater than 350%;

4. assembly:
the composite material composed of the surface layer material, the soft polyurethane foam and the frame are installed on the frame parts of the child safety seat or directly attached to the shell to form the child safety seat.

\* \* \* \* \*